(12) United States Patent
Keller

(10) Patent No.: US 9,845,205 B2
(45) Date of Patent: Dec. 19, 2017

(54) METHOD AND DEVICE FOR DETECTING AND SEGREGATING PIECE GOODS

(71) Applicant: Ferag AG, Hinwil (CH)

(72) Inventor: Roland Keller, Greifensee (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/502,531

(22) PCT Filed: Aug. 6, 2015

(86) PCT No.: PCT/CH2015/000115
§ 371 (c)(1),
(2) Date: Feb. 8, 2017

(87) PCT Pub. No.: WO2016/023135
PCT Pub. Date: Feb. 18, 2016

(65) Prior Publication Data
US 2017/0233197 A1 Aug. 17, 2017

(30) Foreign Application Priority Data

Aug. 13, 2014 (CH) .................................. 1221/14
Jul. 9, 2015 (CH) .................................. 1002/15

(51) Int. Cl.
*B65G 47/82* (2006.01)

(52) U.S. Cl.
CPC ........ *B65G 47/82* (2013.01); *B65G 2203/044* (2013.01)

(58) Field of Classification Search
CPC ........ B65G 47/74; B65G 47/82; B65G 47/04; B65G 47/844; B65G 47/22

(Continued)

(56) References Cited

U.S. PATENT DOCUMENTS

| | | | | |
|---|---|---|---|---|
| 3,642,117 A | * | 2/1972 | Burt | B65G 13/00 209/539 |
| 3,955,678 A | * | 5/1976 | Moyer | B65G 47/50 198/370.07 |
| 4,476,981 A | * | 10/1984 | Yoshida | B07C 5/361 198/370.07 |

(Continued)

FOREIGN PATENT DOCUMENTS

| | | |
|---|---|---|
| DE | 19522217 | 1/1997 |
| DE | 298 12 741 | 9/1998 |

(Continued)

OTHER PUBLICATIONS

English translation of International Preliminary Report on Patentability dated Feb. 14, 2017, Application No. PCT/CH2015/000115.

(Continued)

*Primary Examiner* — James R Bidwell
(74) *Attorney, Agent, or Firm* — Rankin, Hill & Clark LLP

(57) ABSTRACT

A method for targeted detection and segregation of individual piece goods being conveyed in a conveying direction on an extensive conveying element. A position-determining device detects positional information of the piece good to be segregated. The piece good to be segregated is displaced transversely to the conveying device by a push element, which is moved transversely to the conveying direction into the conveying region of the piece goods. Before pushing of the piece good, the push element is now moved into a forward position that lies above the conveying element in the conveying region. The piece good is subsequently pushed by the push element over the conveying element by way of accelerating the push element out of the forward position in a push direction. The forward position is set by a control device depending on positional information concerning the piece good to be segregated on the conveying element.

24 Claims, 8 Drawing Sheets

(58) Field of Classification Search
USPC .......................................... 198/370.07, 456
See application file for complete search history.

(56) References Cited

U.S. PATENT DOCUMENTS

| | | | | |
|---|---|---|---|---|
| 4,643,291 A | * | 2/1987 | Counter | B65G 47/766 198/370.07 |
| 6,837,359 B1 | * | 1/2005 | Bessette | B65G 47/82 198/370.07 |
| 2003/0155285 A1 | * | 8/2003 | Heitzer | B07C 5/362 209/653 |
| 2008/0271975 A1 | * | 11/2008 | Radwallner | B65G 47/766 198/370.07 |
| 2010/0193326 A1 | | 8/2010 | Mougin et al. | |
| 2014/0182997 A1 | | 7/2014 | Hopman et al. | |

FOREIGN PATENT DOCUMENTS

| | | |
|---|---|---|
| DE | 10 2005 021 109 | 11/2006 |
| DE | 10 2008 059 433 | 6/2010 |
| EP | 0 391 301 | 10/1990 |
| EP | 1 260 467 | 11/2002 |
| EP | 2 724 790 | 4/2014 |
| WO | 99/49277 | 9/1999 |
| WO | 2005/097638 | 10/2005 |
| WO | 2014/110684 | 7/2014 |

OTHER PUBLICATIONS

Switzerland Search Report dated Oct. 29, 2014, Application No. 01221/14.

\* cited by examiner

METHOD AND DEVICE FOR DETECTING AND SEGREGATING PIECE GOODS

BACKGROUND OF THE INVENTION

Field of the Invention

The invention relates to the field of conveying technology. It relates to a method for detecting and for the targeted segregation of individual piece goods that are conveyed one after the other in a conveying direction on an extensive conveying element. A position-determining device acquires positional information of the piece good to be segregated. The piece good to be segregated is displaced transversely to the conveying direction by a push element being moved transversely to the conveying direction into the conveying region of the piece goods.

In particular, the push element is moved with a movement component perpendicular to the conveying direction, into the conveying region of the piece goods.

DESCRIPTION OF RELATED ART

The invention moreover relates to an appliance for carrying out the method according to the invention. The appliance includes a conveying device with a movable, extensive conveying element, on which piece goods can be conveyed in a conveying direction individually and one after the other. The appliance moreover includes a position-determining device for acquiring positional information of the piece good to be segregated, and a pushing device with a push element that can be moved over the conveying element into the conveying region of the piece goods, for pushing an individual piece good transversely to the conveying direction. The appliance moreover includes a control device for the control of the movement of the push element.

Appliances of the initially mentioned type fulfil the task of conveying piece goods from a starting location to a destination location. A situation in conveying technology at which one often comes across relates to the conveying of piece goods in a conveying stream on a conveying element, such as a conveying belt, along a common conveying stretch and the leading of the piece goods further to different destination locations or onto different conveying paths.

Thus, in a conveying facility, for example, piece goods are assigned to different destination locations on account of specific characteristics. Such characteristics, for example, can be the weight, the format, the contents, the nature, quality features or a mailing address assigned to the piece good.

Thus with the sorting of parcels, parcels which are conveyed on a conveying belt are sorted according to the criteria mentioned above and are assigned to different destination locations in the conveying facility. Accordingly, devices that segregate the parcels out of the conveying stream and lead them to the respective destination locations are required.

Moreover, piece goods often need to be ejected out of a conveying stream for reasons of quality, and be led to a separate destination location, in a manner separated from the other piece goods. Devices, by way of which the respective piece goods can be segregated from the conveying stream and, e.g., as rejects can be led to a further utilisation, are also necessary in these applications.

Moreover, situations, in which individual piece goods need to be segregated out of a conveying stream due to them not being situated at the correct position according to a specified sequence in the conveying stream also arise in conveying technology. A device that separates the respective piece goods out of the conveying stream is also required in such situations.

Piece goods that are conveyed in a conveying direction, on an extensive conveying element can be segregated by way of devices that are based on different functioning principles.

For this, the devices need to be designed to segregate individual piece goods out of a conveying stream of piece goods, without influencing adjacent piece goods that are not to be segregated.

Thus for example, a deflecting element or push element should not block the conveying path for a piece good that is moved past the device.

According to a first functioning principle, which is known from the state of the art, the device comprises deflecting elements that are moved over the conveying element in front of the piece good to be segregated. The piece good that hits the deflecting element is deflected out of its conveying direction due to the barrier effect of the deflecting element, and is moved laterally away from the conveying element.

A device for deflecting piece goods conveyed on a conveying belt, out of the conveying direction and for the segregating the piece goods is described, for example, in the published document WO 2014 110684 A1.

However, due to the fact that the deflecting elements are moved over the conveying element in front of the piece good, this functioning principle is only suitable if a sufficient distance is present between the piece goods. Moreover, the procedure of the segregation takes place in a comparatively slow manner, since the deflecting element does not actively push the piece good from the conveying element, but merely deflects the piece good passively. The speed of the deflecting procedure depends essentially on the conveying speed. The procedure is comparatively slow even if the deflecting element yet includes an additional drive for laterally conveying away the piece good.

According to a second functional principle known from the state of the art, the device includes push elements, which are moved from the side over the conveying element transversely to the conveying direction of the piece goods and actively push the piece good laterally from the conveying element. This functional principle has the advantage that the push element does not need to be moved between two adjacent piece goods. The piece goods can be conveyed at a smaller distance to one another by way of this. A further advantage lies in the fact that the piece goods can be pushed comparatively quickly from the conveying element due to the active pushing movement of the push element. The speed of the pushing procedure does not therefore depend on the conveying speed of the piece goods, but only on the speed of the push element.

A disadvantage of this functional principle however lies in the fact that the push element, which is moved from standstill over the conveying element, needs to be greatly accelerated, so that this is advanced from its initial position to the piece good, in an as short as possible time and pushes this piece good as quickly as possible from the conveying surface.

The push element therefore laterally hits the piece good, which is to be pushed away, at a comparatively high speed. Thereby, the push element transmits an abrupt movement impulse onto the piece good. The higher the speed of the push element, the more severe does this suddenly occurring movement impulse turn out to be.

The abrupt movement impulse can then damage the piece good. Such a device is therefore not suitable for particularly fragile piece goods.

The abrupt transmission of a movement impulse onto the piece good however also burdens the device and its drive unit. A more robust and thus more expensive construction manner of the device, as well as a higher servicing effort are a consequence of this.

A device for pushing away piece goods conveyed on a conveying belt, out of the conveying direction, and for segregating, which is to say separating out the piece goods, is described for example in the published document DE 195 22 217 C2.

SUMMARY OF THE INVENTION

It is now the object of the present invention, to suggest a device for segregating piece goods that are conveyed on a conveying element, by way of the push element pushing the piece goods from the conveying element in an as gentle as possible manner.

A further object of the present invention is to segregate the piece goods by the push element as rapidly and as efficiently as possible, despite the gentle treatment of these piece goods.

A further object of the present invention is to keep the energy consumption of the device to an absolute minimum.

The method is characterised in that a position-determining device determines positional information concerning a region of the piece good to be segregated, the region facing the push element, and the push element is moved into a forward position lying over the conveying element in the conveying region, before the pushing of the piece good, and the piece good is pushed over the conveying element by the push element by way of accelerating the push element out of the forward position in the push direction, wherein the forward position is determined by a control device in dependence on the positional information of the piece good that is to be separated, on the conveying element. Thereby, the position-determining device forms a first and a second measuring beam path, wherein orthogonal projections of straight lines running through the first and the second measuring beam path, onto a plane including the conveying surface of the conveying element, intersect outside the conveying surface.

The forward (pre-push) position, considered from the piece good in the push direction, lies behind the piece good when the piece good to be segregated has reached its push position.

The piece good in the push position is arranged at least partly laterally of the push element considered in the conveying direction.

The push element is thus moved transversely to the conveying direction, up to the movement region of the piece good, into the forward position. The push element in particular in the forward position waits for the piece good conveyed along the movement region. As soon as the conveyed piece good has reached its push position, the push element is accelerated in the push direction out of the forward position. The push element thereby contacts the piece good laterally considered in the conveying direction.

"Transversely to the conveying direction" means at an angle to the conveying direction. This angle in particular can be 90° (angle degrees).

The push element can push the piece good to be segregated, in particular from the conveying element.

Expressed differently, the push element can push the piece good beyond, which is to say past the conveying element, with the targeted segregation of the piece good.

The control device in particular sets the forward position—also called advance position—such that the push element in the forward position does not engage into the movement region of the piece good to be segregated. I.e., the forward position lies outside the movement region of the piece good to be segregated.

The movement region defines that space, through which the piece good is moved on the conveying element during its conveying in the conveying direction.

If, for example, the forward position were to be in the movement region of the piece good, then the piece good would run onto the push element with its conveying speed and collide with this.

The conveying region comprises all theoretically possible movement regions of the piece goods conveyed on the conveying element. The conveying region as a rule is delimited on the one hand by the lateral termination of the conveying element and on the other hand by the greatest permissible height of the piece goods.

The control device furthermore in particular sets the forward position such that the push element is advanced into the free conveying region over the conveying element, outside the movement region of the piece good to be segregated.

The forward position can be different for the individual piece goods, depending on the position and the dimension of the piece good to be segregated. The forward position should thereby lie as closely as possible to the movement region of the piece good to be segregated, as the case may be whilst including a safely tolerance.

If a piece good to be segregated now reaches the active region of the push element—also called operating area—, then the push element is accelerated out of the forward position in the direction of the piece good to be segregated. The push element hits the piece good at a comparatively low speed due to the fact that the forward position lies close to the piece good.

The push element and the piece good are now accelerated together to a high pushing speed. The piece good is thereby pushed over the conveying element transversely to the conveying direction, by the push element. The piece good in particular has a movement component perpendicular to the conveying direction.

In contrast to conventional devices, in which the push element must be accelerated from an initial position lying outside the conveying element, over a run-up stretch, before it hits the piece good at a comparatively high speed, the run-up (approach) path of the push element is small due to the proximity of the forward position to the movement region of the piece good to be segregated.

The piece good to be segregated is therefore pushed transversely to the conveying direction in a soft, which is to say gentle manner. I.e. the piece good to be segregated is not subjected to an impact by a push element that is greatly accelerated over a comparatively long run-up stretch.

The pushing procedure is moreover significantly quicker, since the push element can push the piece good directly from the forward position. I.e. the approach path from an initial position outside the conveying region up to the forward position is done away with. The forward advance thereby corresponds in particular to a preliminary travel. The pushing travel of the push element, by way of which the piece good is pushed on or from the conveying surface, as a result of this is on average smaller than with conventional methods.

A further advantage lies in the fact that the push element covers smaller paths, since this does not need to be moved back into the initial position outside the conveying region each time after a pushing procedure.

In contrast, the push element can be moved directly with the return travel into the forward position for the piece good which is to be segregated next. This is particularly the case if the forward position for the piece good to be segregated next does not overlap with the movement region of possibly leading piece goods which are not to be segregated.

Alternatively, the push element can also be displaced with the return travel into a waiting position lying outside the movement region of the piece goods that are arranged between two piece goods to be segregated and are not to be segregated.

The waiting position in particular is assumed when the forward position of a trailing piece good to be segregated lies in the moment region of leading piece goods that are not to be segregated.

Considered from the forward position in the push direction, the waiting position therefore lies behind the forward position of the piece good that is to be segregated next of all. The waiting position can however likewise lie in the conveying region.

The push element can be moved out of the waiting position into the forward position for the piece good to be segregated, after the piece goods that are not to be segregated and whose movement region overlaps with the forward position for the next piece good to be segregated have passed the pushing device.

One can envisage the push element basically being moved back into a waiting position after each pushing procedure, and not being moved out of the waiting position in the push direction into the forward position until before or on arrival of the piece good to be segregated.

The return travel of the push element as a result is likewise smaller than with conventional methods on average.

The method and the associated appliance are particularly suitable for segregating piece goods from a stream of individual piece goods that are conveyed individually and one after the other in a conveying direction, on a conveying element. The piece goods in particular are each distanced to one another. The conveying element in particular forms a conveying surface, on which the piece goods lie. The conveying surface can e.g. be plane.

The position-determining device forms a first and a second measuring beam path. An orthogonal projection of the first measuring beam path onto a plane, in which the conveying surface lies, is indicated as a first measuring beam path projection. Analogously, an orthogonal projection of the second measuring beam path onto a plane, in which the conveying surface lies, is indicted as a second measuring beam path projection.

A measuring beam path is to be understood as a beam path of a measuring beam, thus a path stretch of a measuring beam. The measuring beam can thereby run in one direction in the measuring beam path. Or the measuring beam can run in two opposite directions in the measuring beam path.

The measuring beam runs in a straight line over its entire length. The measuring beam path hence runs in a straight line over its entire length.

A measuring beam is indicated as that part of a beam of a position-determining device, whose projection onto a plane, in which the conveying surface lies, crosses the conveying surface furthest upstream in the conveying direction of the conveying element.

For example, a position-determining device can emit a first and a second beam that run in an exclusively straight manner and each always run in the same direction and cross the conveying surface. In this case, the first beam is the first measuring beam and the second beam is the second measuring beam.

As another example, the position-determining device can emit a first and/or second beam, which comprises a sequence of straight lines with different directions. The beam in sections then has a straight form. Such a beam can be designed for example in a V-shaped manner. A beam designed in a V-shaped manner can be produced by way of a beam being deflected or expressed differently, being reflected, at a location. In such a case, that straight section of the beam which in an orthogonal projection onto the plane including the conveying surface is arranged furthest upstream in the conveying direction and which crosses the conveying surface, is the first or second measuring beam. Should a beam cross the conveying surface several times and its orthogonal projection onto the conveying surface lie on the same straight line, then in particular each straight beam whose projection crosses the conveying surface can be indicated as a measuring beam.

The position-determining device detects an interruption of a measuring beam in a measuring beam path. The position-determining device can differentiate whether the measuring beam is interrupted, for instance if the measuring beam hits an object in the measuring beam path, or whether the measuring beam is emitted without interruption, for example if the measuring beam path is free of an object.

Orthogonal projections are right-angled projections. Orthogonal projections of straight lines that run through the first and the second measuring beam path, onto a plane including the conveying surface of the conveying element, intersect outside the conveying surface.

An advantage of the first and second measuring beam projection intersecting outside the conveying surface is the fact that this permits the control device to determine unambiguous positional information of the piece good to be segregated, by way of combination of the signals of the first and the second measuring beam path. If the first and second light beam projection were to intersect within the conveying surface, then one could not unambiguously determine the side of the intersection point, at which the piece good to be segregated passes a measuring beam path, and the evaluation of the measurement signals would not be unambiguous.

This specific geometry with the first and second measuring beam projections intersecting outside the conveying surface permits an inexpensive and efficient positional evaluation by the position-determining device. Such position-determining devices can be manufactured in a simple and inexpensive manner.

Distance sensors have a discrete measuring range, in which these are capable of detecting reliable positional information. Distance sensors are moreover reliant on the piece good to be detected having certain characteristics reflecting the measuring beams. Moreover, distance sensors are expensive.

In contrast to this, position-determining devices that detect an interruption of a measuring beam can acquire positional information concerning piece goods, at almost any distances. These position-determining devices are robust and function in a reliable manner. These position-determining devices are moreover inexpensive to manufacture, to install, to service and/or to repair.

The invention also includes an appliance for segregating piece good according to the method described above. The appliance includes:
- a conveying device including a movable, extensive conveying element with a conveying surface, on which piece goods can be conveyed one after the other in a conveying direction,
- a pushing device including a push element which, for pushing a piece good transversely to the conveying direction, is movable over the conveying element into the conveying regions of the piece goods,
- a control device for the control of the movement of the push element,
- a position-determining device for determining positional information concerning the piece goods on the conveying element, wherein the position-determining device includes a first and a second measuring beam path, and an orthogonal projection of the first measuring beam path and of the second measuring beam path onto a plane, in which the conveying surface lies, is indicated as a first and a second measuring beam path projection, wherein an intersection point of the first measuring beam path projection and of the second measuring beam path projection is arranged outside the conveying surface, and wherein the control device is designed to determine a forward position for the push element, from the positional information determined by way of the position-determining device and to move the push element into the determined forward position, before the pushing of the piece good.

The appliance according to the invention is characterised in that this includes a position-determining device for determining positional information concerning the piece goods on the conveying element, and the control device is designed to determine a forward position for the push element from the positional information determined by way of the position-determining device and to move the push element into the forward position, before the pushing of the piece good.

The positional information concerning the piece goods in particular include information on the alignment and/or position of at least a region of the piece good, on the conveying surface.

The push element in particular forms a contact surface or push surface, via which the piece good to be segregated is contacted by the push element. The push surface can be designed in a plane manner. The push surface e.g. runs perpendicularly to the movement component of the push element, which runs perpendicularly to the conveying direction. The push element can, e.g., be designed as a paddle, board, or panel.

The pushing device in particular includes a guide arrangement that is arranged above the conveying element and in which the push element is displaceably guided. The guide arrangement can include at least one guide profile, such as guide rail, on which the push element is guided via at least one guide member. The push element in particular is displaceable relative to the guide arrangement, which is to say to the guide profile. The guide arrangement can be a linear guidance.

The push element in particular is moved with a linear movement over the conveying element.

The push element, for pushing the piece good is moved over the conveying element, with a movement component perpendicular to the conveying direction of the piece goods. This movement component defines the push travel. The push element can, e.g., be moved over the conveying element perpendicularly to the conveying direction of the piece goods, for pushing the piece good.

For pushing the piece good, the push element can be additionally moved over the conveying element with a movement component in the conveying direction. This means that the push element in particular is moved obliquely over the conveying element.

The movement component of the push element in the conveying direction should take into account the fact that the piece good continues to be conveyed in the conveying direction with a conveying speed by the conveying element during the pushing procedure. An improved guidance of the piece good during the pushing procedure is achieved by way of a movement component of the push element in the conveying direction.

Thus, for example, the speed component of the push element in the conveying direction of the piece good can correspond to the conveying speed of the conveying element.

The pushing device can now include an adjusting mechanism for adjusting the guide arrangement and thus for adjusting the angle between the movement region of the push element which is set by the guide arrangement, and the conveying direction. For this, the adjusting mechanism acts upon the guide arrangement. The adjustment of the mentioned angle effects an increase or a reduction of the movement component of the push element in the conveying direction, relative to the movement component perpendicular to the conveying direction.

The adjusting mechanism can include a pneumatic or hydraulic unit, by way of which the guide arrangement is pivoted relative to the conveying direction about a rotation point, by way of extending and retracting an actuation cylinder.

The pushing device, as already mentioned, can be adapted to different conveying speeds by way of an increase or reduction of the movement component of the push element in the conveying direction, relative to the movement component perpendicular to the conveying direction, on account of pivoting the guide arrangement.

The push element pushes the piece good to be segregated, in particular to a take-over device. The take-over device can be an onward conveying device or a conveying-away device, which conveys the segregated piece good further. The onward conveying device can likewise be an extensive conveying element of the type mentioned further below and on which the piece good is conveyed further.

The onward conveying direction of the onward conveying device can be at an angle or parallel to the conveying direction of the conveying device. The onward conveying device can run next to the conveying device and parallel to this.

The take-over device can also be a collecting device, in which the segregated piece goods are collected and at least temporally kept.

One can also envisage the piece good being pushed by the push element merely into another position on the conveying element, so that this can be received e.g. by the take-over device. The piece good can thus e.g. be diverted onto a branching-away conveying element.

The push element in particular is stopped at the forward position. I.e., the push element remains stationary in the forward position at least for a brief moment.

The push element can be moved from an initial position, in which the push element is arranged outside the conveying region, or from a waiting position, over the conveying element into the conveying region into a forward position.

As already mentioned, it is also possible for the push element subsequent to a push movement, with which a piece good is pushed, to be moved with the return travel back into the forward position for a next piece good to be segregated.

A position-determining device, by way of which positional information concerning a region of the piece good to be segregated and which faces the push element is determined, is provided for determining the forward position. The forward position is determined by way of the control device on the basis of the positional information concerning this region. This region can be a surface, an edge or a point.

A region of the piece good that faces the push element is to be understood as a region that faces the push element when the piece good in the conveying region is arranged in an active region of the push element. Expressed differently, the region of the piece good that faces the push element indicates a region of the piece good that faces the push element when the piece good is located in a potential segregating position.

The position-determining device in particular determines the positional information of the piece good whilst using predetermined information.

In particular, the predetermined information can include information that in a section of the conveying element that extends from upstream of the position-determining device in the conveying direction to downstream of the push element, the region of the piece good to be segregated and that faces the push element is arranged essentially parallel to the conveying direction, in an orthogonal projection onto the conveying surface.

Essentially parallel is to be understood in that maximally an angle of 30 degrees, in particular maximally an angle of 15 degrees and in particular maximally an angle of 5 degrees is formed.

The positional information can be determined in a simple and reliable manner by way of applying the assumption that the region of the piece good that faces the push element is aligned essentially parallel to the conveying direction.

The position-determining device in particular determines the positional information of the piece good whilst using at least one predetermined characteristic of the piece good.

A predetermined characteristic of the piece good for example is the fact that the piece good has a shape of a cuboid.

The positional information can be determined in a simple and reliable manner by way of applying the assumption that the piece good has a predetermined characteristic. The dimension and position of the cuboid can be determined in a simple and reliable manner in the case of a cuboid piece good.

The position-determining device can determine the positional information of the piece good, for example whilst using the predetermined characteristic of the piece good as well as whilst using the predetermined information.

The more information that is known concerning the characteristics of the piece good and/or its position with respect to the conveying direction, and that can be used for determining the position, the simpler and more reliable can the position and/or dimension of the piece good be determined.

The position-determining device in particular permits the evaluation of positional information concerning the outermost region of the piece good to be segregated and that faces the push element. The outermost region is the edge, the surface or the point of the piece good, which in the push position has the smallest distance to the push element.

In particular, the position-determining device determines a length of an orthogonal projection of the region of the piece good to be segregated and that faces the push element, onto the conveying surface.

The position-determining device is accordingly arranged upstream of the pushing device.

A safety tolerance is also to be advantageously included with the evaluation of the forward position, and this safety tolerance is to ensure that measuring inaccuracies due to the position-determining device or inaccuracies in the computation of the forward position on the basis of the positional information, do not lead to the forward position coming to lie in the movement region of the piece good to be segregated, despite this.

In the forward position, the distance between the push element, more specifically its push surface and the outermost region of the piece good to be segregated and that faces the push element is e.g. 5 cm or less, in particular 3 cm or less.

According to a further development of the invention, positional information concerning a region of the piece goods not to be segregated and that faces the push element is determined by the position-determining device.

In particular, positional information concerning the outermost region of the piece goods not to be segregated and that faces the push element is determined by the position-determining device.

Depending on the positional information concerning the piece goods not to be segregated, the control device can compute whether the push element must be moved back into the next forward position or firstly into a waiting position.

The position-determining device can also be designed to determine positional information concerning the piece good to be segregated, by way of which information the point in time of the arrival of the piece good to be segregated, into the push region of the push element can be computed.

In particular, positional information concerning a region of the piece good to be segregated and that leads in the conveying direction is determined. In particular, positional information concerning the region of the piece good to be segregated and that is frontmost in the conveying direction can be determined.

The point in time of the arrival of the piece good to be segregated can be determined from this positional information, in dependence on the likewise determined conveying speed.

Further positional information, by way of which variables such as the length or width of the piece good to be segregated can moreover be determined by the position-determining device. The dimension information can serve for controlling the push element such that this hits the piece good in an as centred as possible manner.

With regard to the method, on pushing the piece good, the push element can engage the region of the piece good to be segregated and which faces the push element, in an essentially central manner in an orthogonal projection onto the conveying surface, for the targeted segregation.

A central engagement of the push element can permit a gentle, rotation-free and/or uniform pushing.

Positional information concerning a region of the piece good to be segregated and that trails in the conveying direction can be determined. In particular, positional information concerning the region of the piece good to be segregated and that is rearmost in the conveying direction can be determined.

The position-determining device in particular includes an opto-electronic measuring system with at least one opto-electronic component, for determining positional information.

The opto-electronic component can for example be an optical camera or, as yet described hereinafter, a light barrier or an optical distance meter. A combination of several opto-electronic components, which are of the same type or which are different, is likewise possible.

The position-determining device in particular forms a first and a second measuring beam path, by way of the position-determining device emitting a first and a second light beam.

Measuring beams can be produced inexpensively and in a safe manner by way of light beams.

The control device in particular is designed to evaluate measurement data of the position-determining device, such as transit times of light beams, interruptions of light beams, light intensities, object contours, picture contents, etc., and to derive positional information from this. The control device comprises suitable software means for deriving positional information from the measurement data.

According to an embodiment of the invention, the position-determining device comprises at least one light barrier and in particular at least two light barriers.

With a light barrier, the respective part of the light beam is the measuring beam.

The light barrier is a contact-free, opto-electronic system that recognises and registers the interruption of the light beam by a piece good. Positional information concerning the piece good moved by the conveying element is obtained at a certain point in time in this manner.

The light of the light beam can lie in the visible range. The light can lie in the infrared range. The light beam can be a laser beam.

The light barrier includes a light source (emitter) for emitting a light beam, and a sensor (receiver) for receiving the light beam. The light source can be a light diode or a laser diode. The receiver can be a photo-transistor, a light-sensitive resistor or a photo-diode.

The light barrier can be a through-beam light barrier, with which the emitter and receiver lie opposite one another.

The light barrier can be a reflex light barrier, at which the light beam is thrown back to the receiver via a reflector. The emitter and receiver in particular are located parallel to one another and, e.g., are arranged in a common housing.

If the position-determining device includes at least two light barriers, then the light sources can be arranged above one another. The light sources can also be arranged next to one another. The light sources can also be arranged over one another in a horizontally offset manner or next to one another in a vertically offset manner.

Light sources arranged next to one another in particular are to be understood as light sources that are arranged successively considered in the conveying direction.

The light sources in particular are arranged on a common axis. The common axis can be arranged parallel to the conveying direction. The common axis in particular can be arranged essentially perpendicularly to the conveying surface of the conveying element.

The light beams are directed over the conveying element. The light beams are directed into the conveying region of the piece goods. The light beams each have a direction component perpendicular to the conveying direction. The light beams in particular each have also a direction component counter to the conveying direction.

A light beam in particular is also to be understood as its beam path.

The fact that a light beam is directed over the conveying element, expressed differently means that the light beam runs above the conveying surface of the conveying element and does not form an intersection point with the conveying surface. A light beam directed into the conveying region, at least in sections runs in the conveying region and does not form an intersection point with the conveying surface.

The light beams of the two light barriers in particular each enclose an acute angle with a plane perpendicular to the conveying direction. The angle in particular is larger than 0° (angle degrees) and smaller than 60°. The angle in particular is larger than 5° and smaller than 45°.

The mentioned angles of the two light beams to the plane in particular are different. Accordingly, the two light beams in particular enclose an acute angle to one another. The angle in particular is larger than 0° (angle degree) and smaller than 60°. The angle in particular is larger than 5° and smaller than 45°.

A positional information concerning a region of the piece good that faces the push element can now be determined by way of the control device and amid the application of angle functions, on the basis of the conveying speed of the piece good and of a first signal generated by the interruption of the first light beam and of a second signal generated by the interruption of the second light beam, due to a piece good conveyed past the light barriers.

The light beams are thereby interrupted by that region of the piece good, concerning which the positional information is determined.

It is particularly positional information concerning an outermost region of the piece good that faces the push element which is determined.

The lengths and the width of a rectangle-shaped piece good or at least the length and width detail concerning a piece good can also be deduced by way of the interruption of the light barriers, which is mentioned above.

What is meant by a rectangle-shaped piece good is a piece good whose orthogonal projection onto the conveying surface has a rectangular shape. A rectangular piece good in particular is cuboid.

One example for determining the positional information according to the above description is specified hereinafter by way of one embodiment example.

The appliance includes a sensor device for determining the conveying speed. The sensor device can be designed for measuring the speed of the conveying element. The measurement of the speed of the conveying element in particular is effected in the environment of the pushing device. The sensor device in particular is arranged upstream of the pushing device.

The sensor device can be designed for measuring the speed of a moved element of a drive device.

The sensor device can be designed for detecting moved elements of the conveying element, such as chain links, or of the drive device, such as cogs, which are arranged at regular distances to one another. The conveying speed and, as the case may be, cycle information can be derived from the time difference between two elements that are successively detected. The sensor device as a result can also be designed for path cycle measurement (pace measurement).

The control device is designed to evaluate the determined positional information and speed information and to activate the push element by way of a drive unit, on the basis of the positional information and speed information.

The control device in particular is designed to determine forward positions from the mentioned positional and speed information, and to move the push element into the respective forward position by way of a drive unit.

The control device in particular is designed to set the point in time for the pushing movement of the push element, from the mentioned positional and speed information, in order to displace the piece good to be segregated, on the conveying element.

The control device can moreover include an interface, via which this can communicate with a superordinate control. The control device, e.g., can obtain information on the piece goods to be segregated, from the superordinate, which is to say higher-level control. The superordinate control can be the control of the conveying appliance or the control of the facility, into which the conveying appliance is integrated.

The control device in particular comprises suitable data processing means such as microprocessors and data memories, as well as interfaces.

Alternatively or additionally to the at least one light barrier described above, the position-determining device can include at least one distance sensor, by way of which positional information concerning the outermost region of a piece good which is at the side of the push element can be determined. The forward position for the push element can be computed from the positional information. The distance sensor can be based on a light transit time measurement.

The distance sensor, considered in the conveying direction, in particular is arranged laterally of the conveying element, at the side with the push element. The measuring beam in particular is directed over the conveying element.

The measuring beam in particular is directed into the conveying region. The measuring beam in particular is aligned perpendicularly to the conveying direction.

The push element can be rotatably mounted about a rotation axis. The push element can be pivoted into the push position and be pivoted again out of the push position in this manner. The rotation axis can be arranged perpendicularly to the conveying surface of the conveying element. The rotation axis can be arranged parallel to the conveying surface of the conveying element. For example, with the return travel, the push element can evade a subsequent piece good due to this rotatability.

The pushing device in particular includes a drive unit for driving the push element. The drive unit can e.g. be a servo-drive with a servo-motor, as well as a servo-controller. The servo-controller in particular includes power electronics. The servo-controller can be a dc motor, an asynchronous motor or a synchronous motor The pushing device can also include a pneumatic drive for driving the push element.

According to a further embodiment of a pushing device, this includes a holding device that is rotatable about a rotation axis and on which at least one push element is arranged. The rotation axis thereby in particular runs parallel to the conveying device. The pushing device in particular is arranged above and laterally of the conveying surface of the conveying element.

The at least one push element, which is held by the holding device, or the holding device, is now rotatable in a closed movement path about the rotation axis. The movement path is e.g. arched, in particular circularly arched.

The pushing device is now designed and arranged relative to the extensive conveying element, and more specifically to the conveying surface, such that the push element is movable over the extensive conveying element transversely to the conveying direction, in a movement path section, in particular in a lower movement path section, and can thus push piece goods transversely over the conveying element, in particular transversely from the conveying element.

If the at least one push element is moved along an arched movement path about the rotation axis, then this element accordingly does not carry out a pure translatory movement over the conveying element.

However, the push element can be articulately fastened to the holding device via a joint connection. The articulated fastening of the push element permits a relative movement of the push element to the holding device. A movement superimposed on the circulating movement can be produced by way of a relative movement in this manner. For example, a translatory movement of the push element over the conveying element can be carried out with such a superimposed movement, even if the holding device describes an arcuate or arched path about the rotation axis, over the conveying element.

The relative movement moreover permits an alignment of the push surface of the at least one push element, the alignment being independent of the movement path about the rotation axis.

The holding device can include at least one holding arm, which is rotatably mounted about the rotation axis and on which the at least one push element is arranged.

The pushing device can include several push elements, which are arranged on the holding device, along the periphery of the holding device about the rotation axis and spaced from one another, and which on executing a pushing function are movable over the conveying element one after the other, by way of a rotation of the holding device about the rotation axis. The holding device can include a plurality of holding arms for this.

The advantage of this pushing device is the fact that the at least one push element does not execute a discontinuous movement procedure composed of a forward travel and return travel, but in contrast is movable in the same direction about the rotation axis.

The pushing device can further include a recuperation brake, by way of which movement energy is converted into electrical energy on braking the push element. The electrical energy can then be fed into an electrical circuit again.

If the appliance comprises several alternatingly operated push elements, then the electrical energy for driving another push element can be fed into an intermediate circuit of the appliance.

The recuperation brake can be an electromagnetic brake or electrical generator brake. The recuperation brake can be formed by an asynchronous motor or a three-phase synchronous motor, which operate in generator operation.

The conveying element in particular is a circulating conveying element. The conveying element can be a conveying belt, a conveying strap or a modular belt chain with a plurality of plate elements that are linked to one another. The conveying element can also be a roller carpet with a plurality of stationary rollers. The rollers can be actively driven or passively driven by the moved piece goods. Further conveying elements, which are not mentioned here and which form a conveying surface, are possible.

The piece goods can be parcels, boxes, cartons, crates, pockets, packaged goods, such a foodstuff, cartons, drinks containers, bundled printed products, etc.

The invention moreover also relates to a kit for an appliance for carrying out the method described above, the device also having been described above.

The kit includes a pushing device with a mount that is supported at least at one or two sides. The mount in particular is a support construction of profiles.

The mount has a support structure, which is positionable over a conveying element, i.e. above the conveying element. The support structure in particular runs transversely over the conveying element. A guide arrangement is arranged on the support structure. The push element is displaceably guided above the conveying element, in the guide arrangement.

An adjusting device, which is described above and is for adjusting the guide arrangement, can be also be arranged on the mount.

A drive arrangement such as a servo-drive, which has been described above can also be arranged on the mount.

The kit in particular also includes a position-determining device. The position-determining device can likewise have a mount or several mounts, on which means, in particular sensor means for detecting positional information concerning the piece goods are arranged. These means can be elements of light barriers, such as a light source, light sensor or reflector, as well as distance sensors or cameras.

The kit can moreover also include a speed sensor that directly or indirectly measures the speed of the conveying element or a moved element of the drive device, for determining the conveying speed of the piece goods.

The kit can moreover include a control device of the type described above.

The kit according to the invention is characterised in that this is independent of the conveying appliance. The pushing device as well as the position-determining device and the speed sensor are independent of the conveying appliance. Accordingly, an existing conveying appliance can be retrofitted with such a kit. This is effected without having to carry out any significant modifications on the associated conveying appliance.

One merely needs to create a connection to a super-ordinate control via the interface of the control device, in order to obtain process-relevant information, such as control information concerning the piece goods to be segregated, from this higher-ranking control.

BRIEF DESCRIPTION OF THE DRAWINGS

The subject-matter of the invention is hereinafter explained in more detail by way of particular embodiment examples which are represented in the attached figures. In each case schematically are represented in.

DETAILED DESCRIPTION OF THE INVENTION

Figures 1, 2:
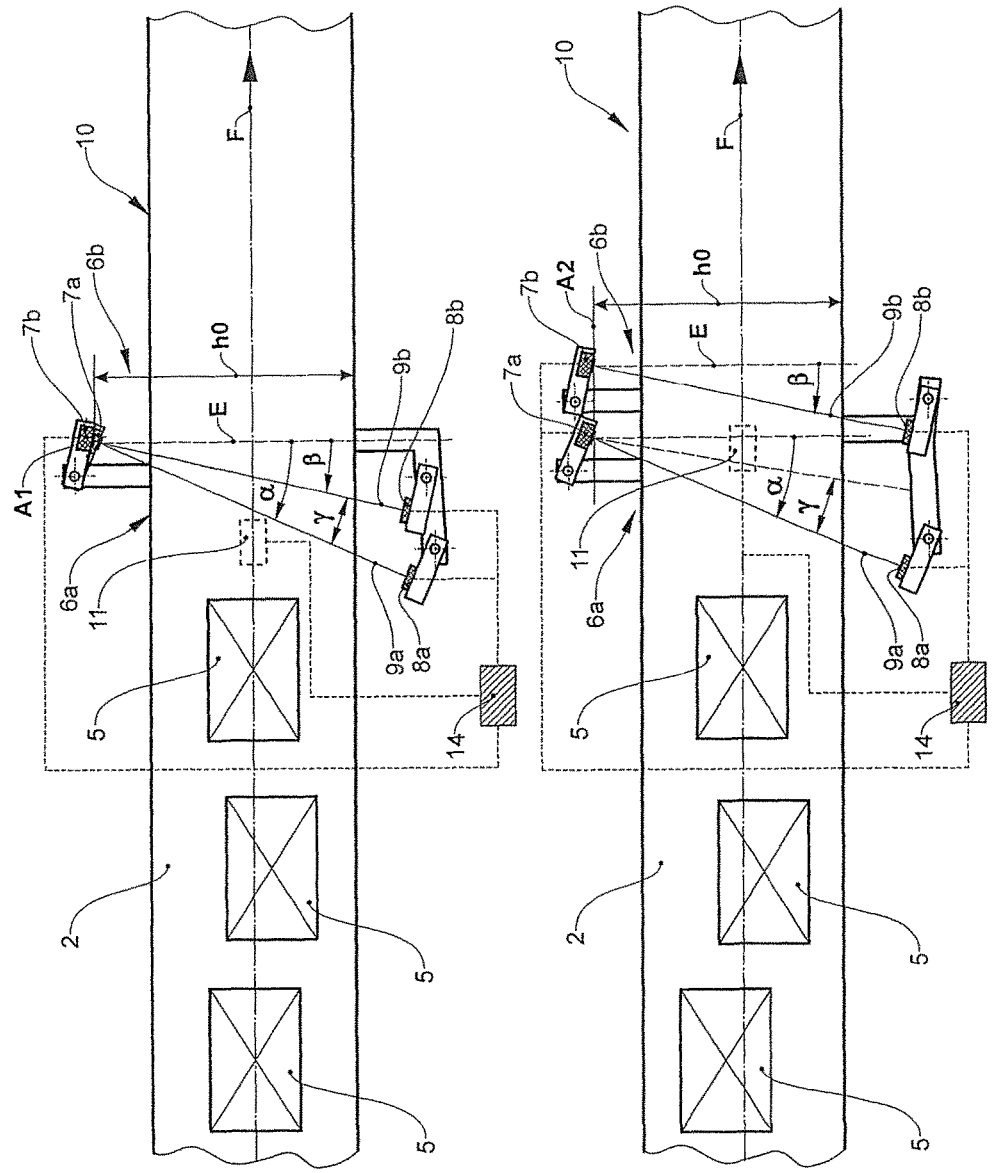
FIG. 1: a plan view of an appliance according to the invention, from the region of the position-determining device, according to a first embodiment.
FIG. 2: a plan view of an appliance according to the invention, from the region of the position-determining device, according to a second embodiment.

Basically, in the figures, the same parts are provided with the same reference numerals. The described embodiment examples are to represent the subject-matter of the invention merely by way of example, and have no limiting effect.

FIGS. 1, 2, 3a and 3b show a belt conveyor 10 with a conveying belt 2 as a conveying element, on which rectangular piece goods 5 are conveyed in a conveying stream and distanced to one another, in the conveying direction F.

A speed sensor 11, by way of which the speed of the conveying belt 2 and thus the conveying speed of the piece goods 5 in the region of the pushing device is directly or indirectly determined, is arranged on the belt conveyor 10, below the conveying belt 2.

FIGS. 1, 2, 3a, and 3b now show different embodiments of position-determining devices arranged on the belt conveyor 10.

In the appliance according to the invention, the position-determining device as well as the speed sensor 11 are each arranged upstream of the pushing device.

The position-determining devices according to FIGS. 1, 2, 3a and 3b each include a first light barrier 6a with a first light source 7a and with a first sensor 8a. The light source 7a of the first light barrier 6a produces a first light beam 9a, which is directed to the first sensor 8a. The light source 7a and the sensor 8a are arranged at sides of the conveying belt 2 that lie opposite one another.

The position-determining device moreover includes a second light barrier 6b with a second light source 7b and with a second sensor 8b. The light source 7b of the second light barrier 6b produces a second light beam 9b, which is directed to the second sensor 8b. The light source 7b and the sensor 8b are arranged at sides of the conveying belt 2 that lie opposite one another. The light beams 9a, 9b traverse the conveying element 2 above the conveying surface and are directed into the conveying region.

The light sources 7a, 7b of the first and second light barrier 6a, 6b are fastened on a common carrier. The sensors 8a, 8b of the first and the second light barrier 6a, 6b are likewise fastened on a common carrier.

The first light beam 9a encloses an acute angle α to a plane E that is arranged perpendicularly to the conveying direction F. The second light beam 9b encloses an acute angle β to the mentioned plane E. The two angles α and β are differently large. As a result, the two light beams 9a, 9b likewise enclose an acute angle γ to one another.

The sensors 8a, 8b are arranged on the opposite side of the conveying belt 2 such that these receive the light beams 9a, 9b.

The sensors 8a, 8b are arranged on the same side of the conveying belt 2 as the push element.

According to the embodiments shown in FIGS. 1 and 3, the two light sources 7a, 7b are positioned above one another on a common axis A1, which is arranged perpendicularly to the conveying surface.

According to the embodiment shown in FIG. 2, the two light sources 7a, 7b are positioned next to one another on a common axis A2, which is arranged perpendicularly to the plane E.

Figure 4A:
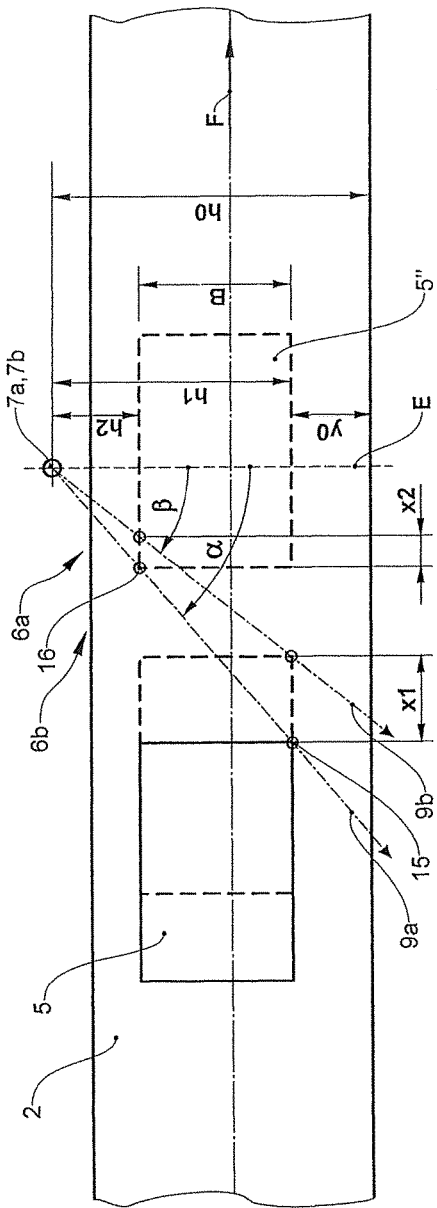
FIG. 4a: a plan view onto a schematically represented conveying device with the course of the light beam of the light barriers, with inserted geometric variables for determining a distance h1.
Figure 4B:
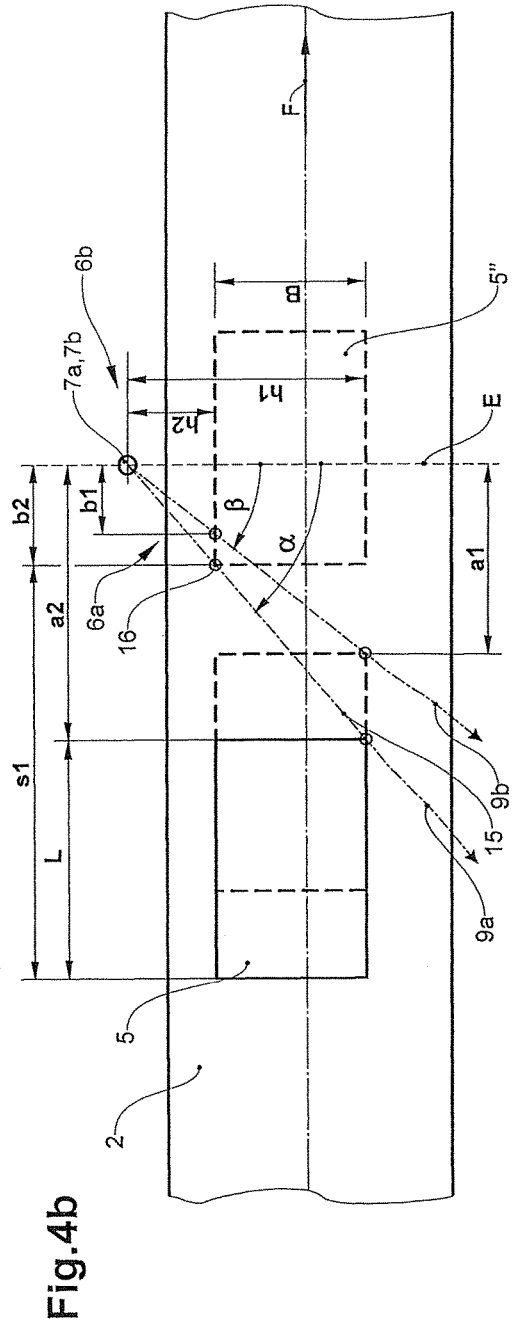
FIG. 4b: a plan view onto a schematically represented conveying device with the course of the light beam of the light barriers with inserted geometrical variables for determining a width B and a length L of the piece good.

The functioning manner of the light barriers 6a, 6b for determining positional information concerning the conveyed piece goods 5 is hereinafter explained in more detail by way of FIGS. 4a and 4b.

Figure 3A:
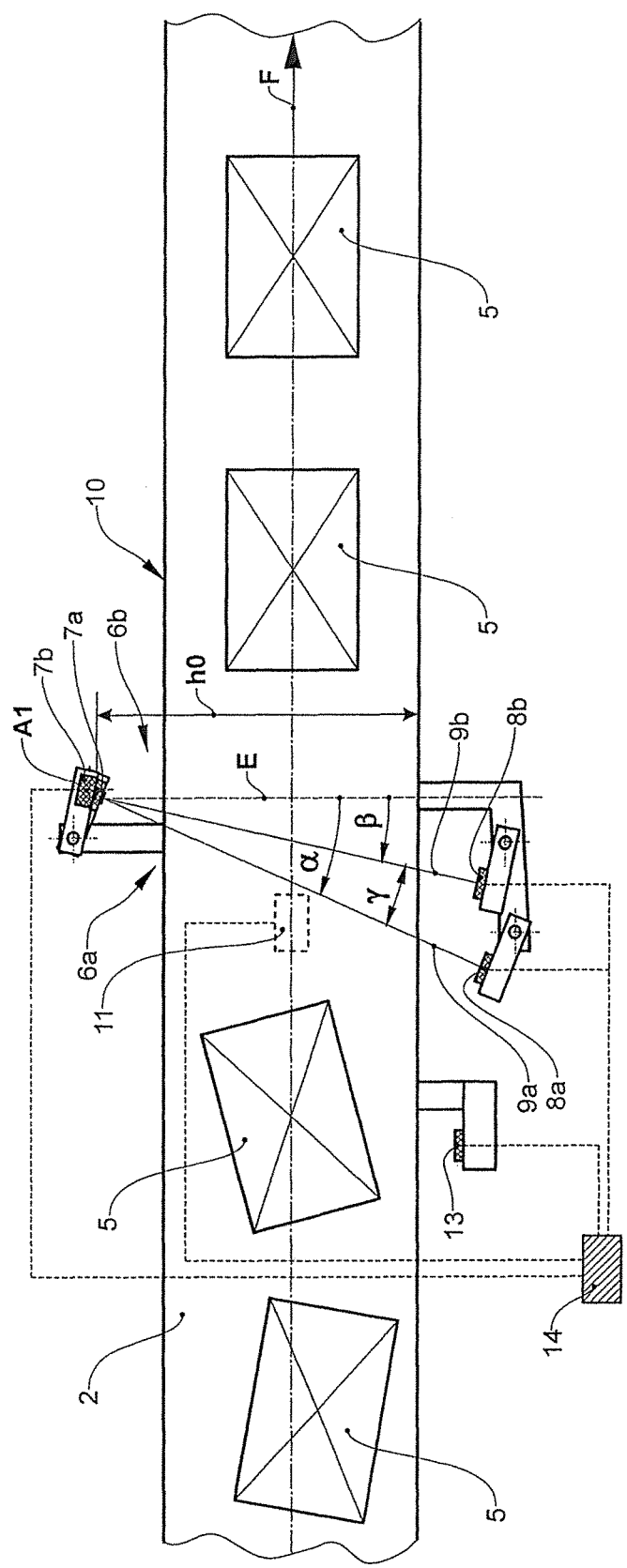
FIG. 3a: a plan view of an appliance according to the invention, from the region of the position-determining device, according to the third embodiment.

The position-determining device according to the embodiment shown in FIG. 3a additionally includes a distance sensor 13 that is arranged on the same side of the belt conveyor 10 as the push element. The distance sensor 13 serves for measuring the distance to the piece good 5. The outermost region of the piece good 5 that faces the push element can therefore be determined by the distance sensor 13. The forward position of the push element can be determined from the distance information, such as transit times of a signal, due to the fact that the position of the distance sensor 13 is known.

The distance sensor 13 above all is particularly useful if the piece goods 5 are arranged on the conveying belt in an oblique (slanted) manner or have a complex geometric dimension. In these cases, the position of the outermost region of the piece good 5, which faces the push element cannot be measured accurately enough by way of the light barriers 6a, 6b. The position of this region however is of great significance, since the forward position to be determined depends on this.

Figure 3B:
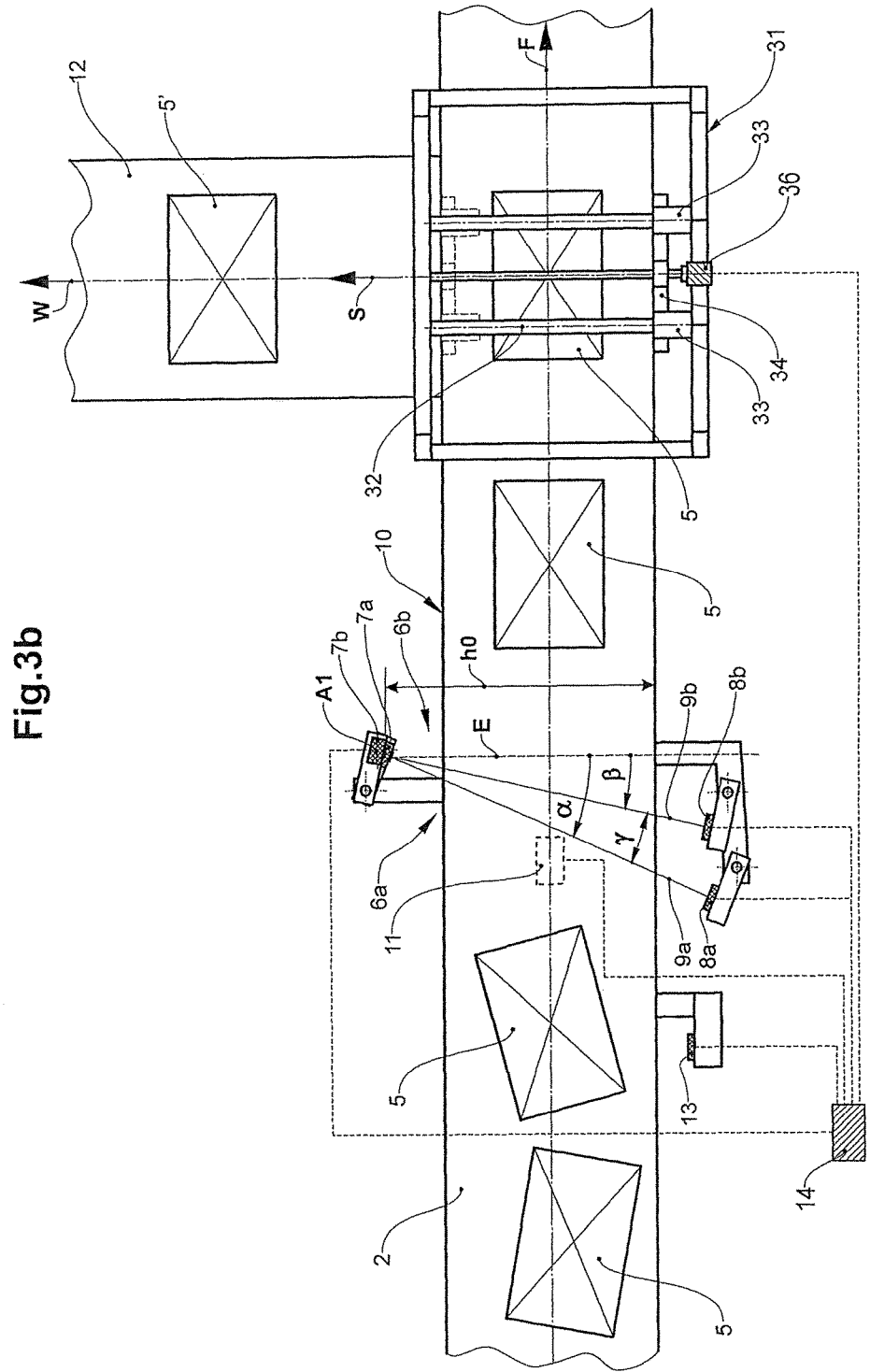
FIG. 3b: a plan view of an appliance according to the invention, with a position-determining device according to FIG. 3a and with a pushing device according to FIGS. 5a to 5c.
Figure 5A:
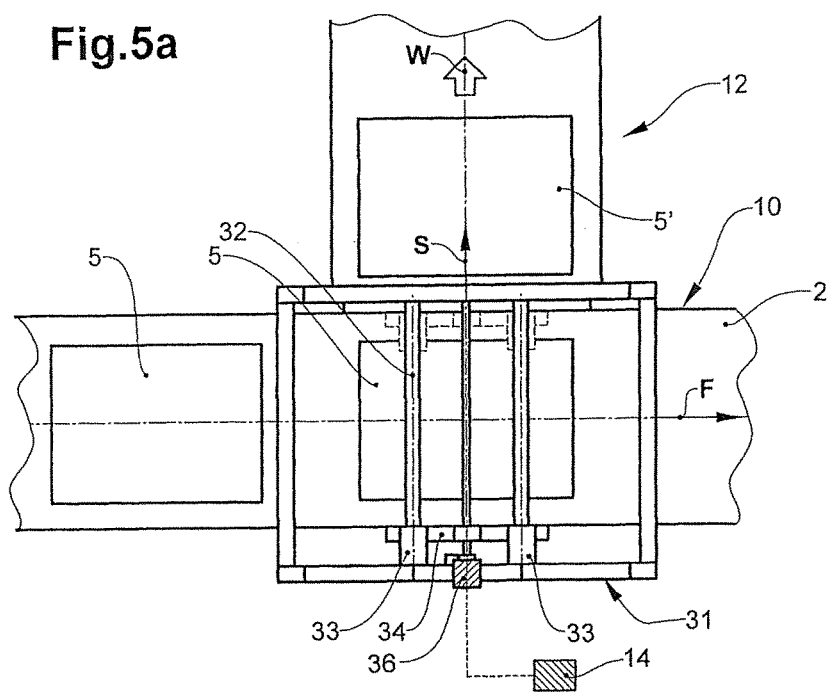
FIG. 5a: a plan view of an appliance according to the invention, from the region of the pushing device, according to a first embodiment.
Figure 5B:
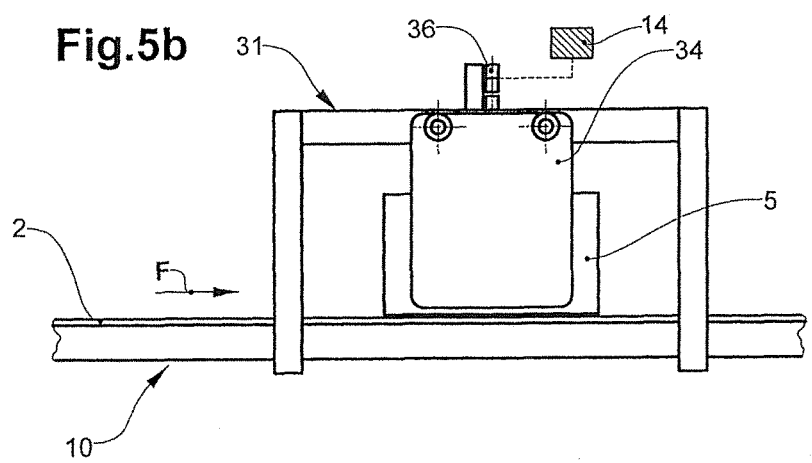
FIG. 5b: a lateral view of the appliance according to FIG. 5a, transversely to the conveying direction.
Figure 5C:
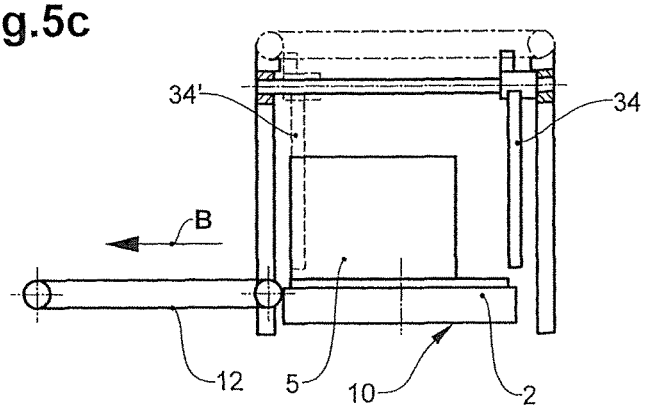
FIG. 5c: a view of the appliance according to FIGS. 5a and 5b, in the conveying direction.

FIG. 3b now shows an embodiment of an appliance according to the invention, with a position-determining device according to FIG. 3a and with a pushing device according to FIGS. 5a to 5c. The pushing device is hereinafter described in more detail by way of the FIGS. 5a to 5c. The elements of the position-determining device, such as the first and the second light barrier 6a, 6b and the distance sensor 13, as well as the speed sensor 11 and moreover the drive arrangement 36 with the drive, with regard to control are connected to one another via a common control device 14.

Figure 9:
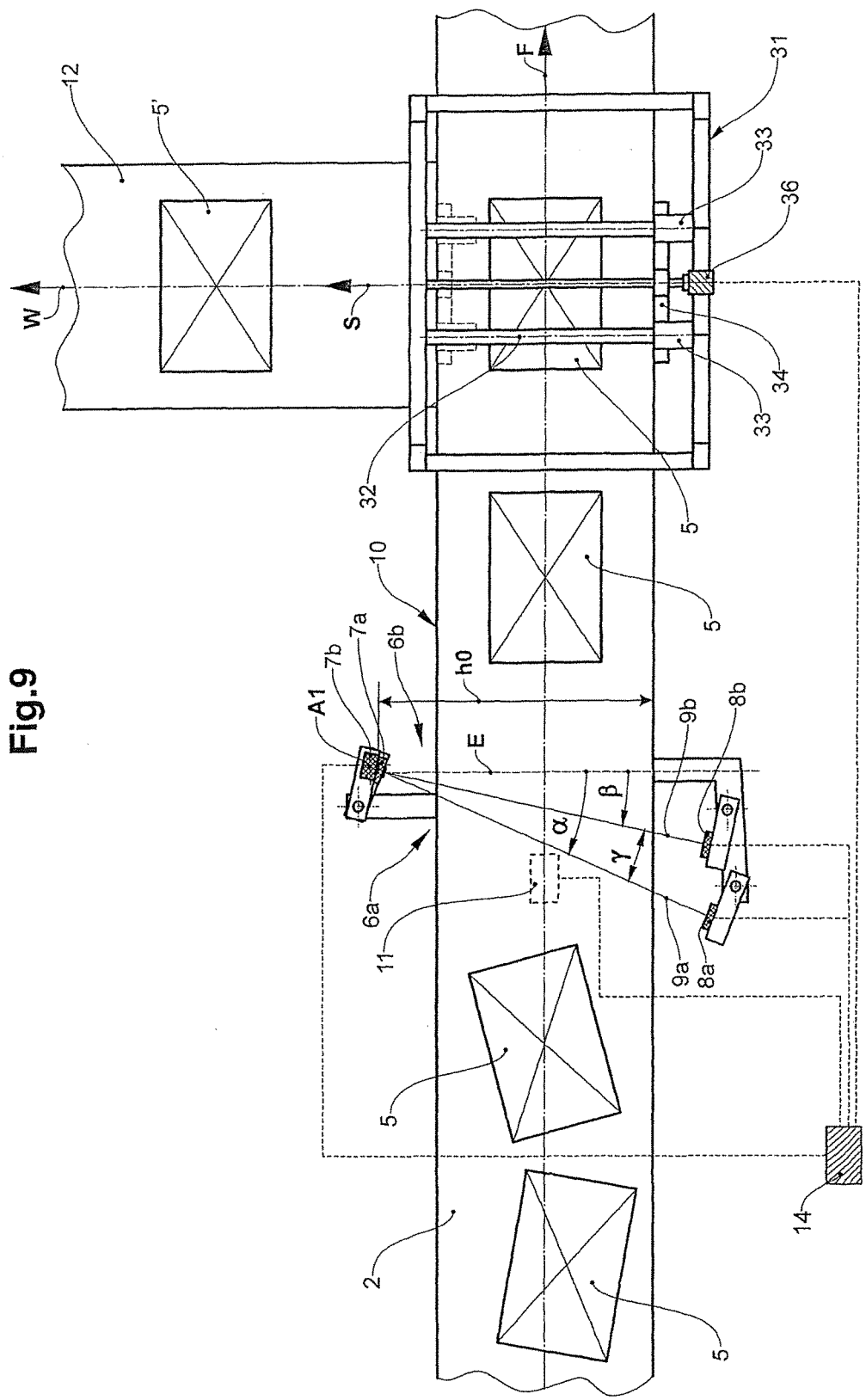
FIG. 9: a plan view of an appliance according to the invention, analogously to FIG. 3a, but without a distance sensor.

An embodiment of a position-determining device is represented in FIG. 9 analogously to FIG. 3b, wherein the position-determining device in FIG. 9 has no distance sensor 13 in comparison to that in FIG. 3b.

For the idealised case of a rectangular piece good aligned parallel to the conveying direction F, the arrangement of light barriers 6a, 6b, which is described above, and the alignment of the light beams 9a, 9b now permits the evaluation of the width B and the length L of the piece good, as well as the evaluation of the distance h1 between the light source 7a, 7b and the outermost edge 15 of the piece good 5, which is directed to the push element, and from this, the evaluation of the forward position of the push element. The width B thereby relates to the extension of the piece good 5 perpendicular to the conveying direction F, and the length L relates to the extension of the piece good 5 in the conveying direction F.

The trigonometric relations, which permit the computation of the forward position, are hereinafter described by way of FIGS. 4a and 4b. FIGS. 4a and 4b schematically show the rectangular piece good 5, 5" which, on a conveying belt 2, is aligned parallel to the conveying direction, in two conveying positions in the region of the light barriers 6a, 6b.

Known variables on the one hand are the angle α and β that the two light beams 9a, 9b respectively enclose with the plane E perpendicular to the conveying direction F. The position of the light sources 7a, 7b as well as the distance h0 between the light sources 7a, 7b and the end of the conveying element 2 that lies opposite the light sources 7a, 7b is also known. The conveying speed, with which the piece good 5 is conveyed in the conveying direction F is also known.

During its conveying, the piece good 5 with a first edge 15 hits the first light beam 9a of the first light barrier 6a and interrupts this. The first edge 15 is a leading, outermost edge that faces the push element. The point in time of the interruption of the light beam 9a is registered by the associated sensor 8a of the first light barrier 6a.

After covering the conveying path x1, the piece good 5 with the first edge 15 also interrupts the second light beam 9b of the second light barrier 6b. The point in time of the interruption of the second light beam 9b is registered by the associated sensor 8b of the second light barrier 6b.

The function:

$$x1 = a2 - a1 = h1 \cdot (\tan \alpha - \tan \beta)$$

can be derived from the trigonometric relations (see FIG. 4a):

$$a1 = h1 \cdot \tan \beta \quad a2 = h1 \cdot \tan \alpha$$

and from this, the function:

$$h1 = \frac{x1}{(\tan \alpha - \tan \beta)}$$

The two angles α and β are already known. The distance x1 can be computed from the known conveying speed and from the time interval between the interruption of the two light barriers 6a, 6b. The distance h1 can hence also be computed.

As a result, the distance y0 from the mentioned edge of the piece good 5 to the edge of the conveying element 2, at the side that faces the push element can also be computed from the distance h1:

$$y0 = h0 - h1$$

$$y0 = h0 - \frac{x1}{(\tan \alpha - \tan \beta)}$$

As a result, the forward position can also be computed from y0.

The distance h2 between the light sources 7a, 7b and the piece good 5 on the conveying element 2 is required for computing the width B of the piece good.

$$B = h1 - h2$$

If the piece good 5" that has been conveyed further in the meanwhile now leaves the region of the light barriers 6a, 6b again, then a second edge 16 of the piece good 5" releases the first light barrier 6*a* again. The second edge 16 is a trailing outermost edge that faces the light sources 7*a*, 7*b*. The point in time of the lifting of the interruption of the first light beam 9*a* by the piece good 5 is accordingly registered by the respective sensor 8*a*.

The piece good 5" after covering the conveying path x2, at the second edge 16 also releases the second light beam 9*b* of the second light barrier 6*b*. The point in time of the lifting of the interruption of the second light beam 9*b* is likewise registered by the associated sensor 8*b* of the second light barrier 6*b*. The distance h2 can now be derived from x2, analogously to the distance h1, so that the following relationship results:

$$B = \frac{x1}{(\tan\alpha - \tan\beta)} - \frac{x2}{(\tan\alpha - \tan\beta)}$$

or simplified:

$$B = \frac{x1 - x2}{(\tan\alpha - \tan\beta)}$$

The length of the piece good 5 can also be derived from the following relation:

$$s1 = L + h1 \cdot \tan(\alpha) - h2 \cdot \tan(\alpha)$$

$$s1 = L + \tan(\alpha) \cdot (h1 - h2) = L + \tan(\alpha) \cdot B$$

$$L = s1 - \tan(\alpha) \cdot B$$

The distance s1 can be computed from the conveying speed as well as the time interval between the interruption of the first light beam 9*a* of the first light barrier 6*a* and the lifting of the interruption of the first light beam 9*a*.

The ideal activation point in time for the push element 4 can be determined by way of the control device 14, on the basis of the now known length L of the piece good, so that this push element can contact the piece good 5 as centrally as possible on it being pushed. The optimum push travel $H_S$, which is necessary in order to push the piece good 5 to the take-over device until this is moved further on its own accord or with the assistance of a conveying element of the take-over device, can now be computed on the basis of the known width B of the piece good 5.

If now the piece good 5, as is illustrated in FIG. 3, is not aligned parallel to the conveying direction F, but obliquely to this, then the trigonometric relationships mentioned above no longer correctly deduce the effective length L and width B of the piece good. The mentioned variables in contrast correspond to the distance between the leading and the trailing, outermost edges parallel and perpendicular to the conveying direction F and detected by the light barriers 6*a*, 6*b*.

In other words, a virtual, smaller rectangular or cuboid shape with accordingly shortened slide lengths could be computed by this distance due to the assumption that the piece good is aligned parallel to the conveying direction.

This, in the case of a slight inclination of the piece good only leads to slight deviations which can be neglected for the present application. Slight deviations can be corrected by adopting safety tolerances, on computing the forward position. However, with a larger inclination, the outermost edge that faces the push element cannot be correctly detected. An incorrect value is computed for the forward position due to this. The additional distance sensor 13 as is shown in FIG. 3 provides a remedy in such situations.

Figure 6:
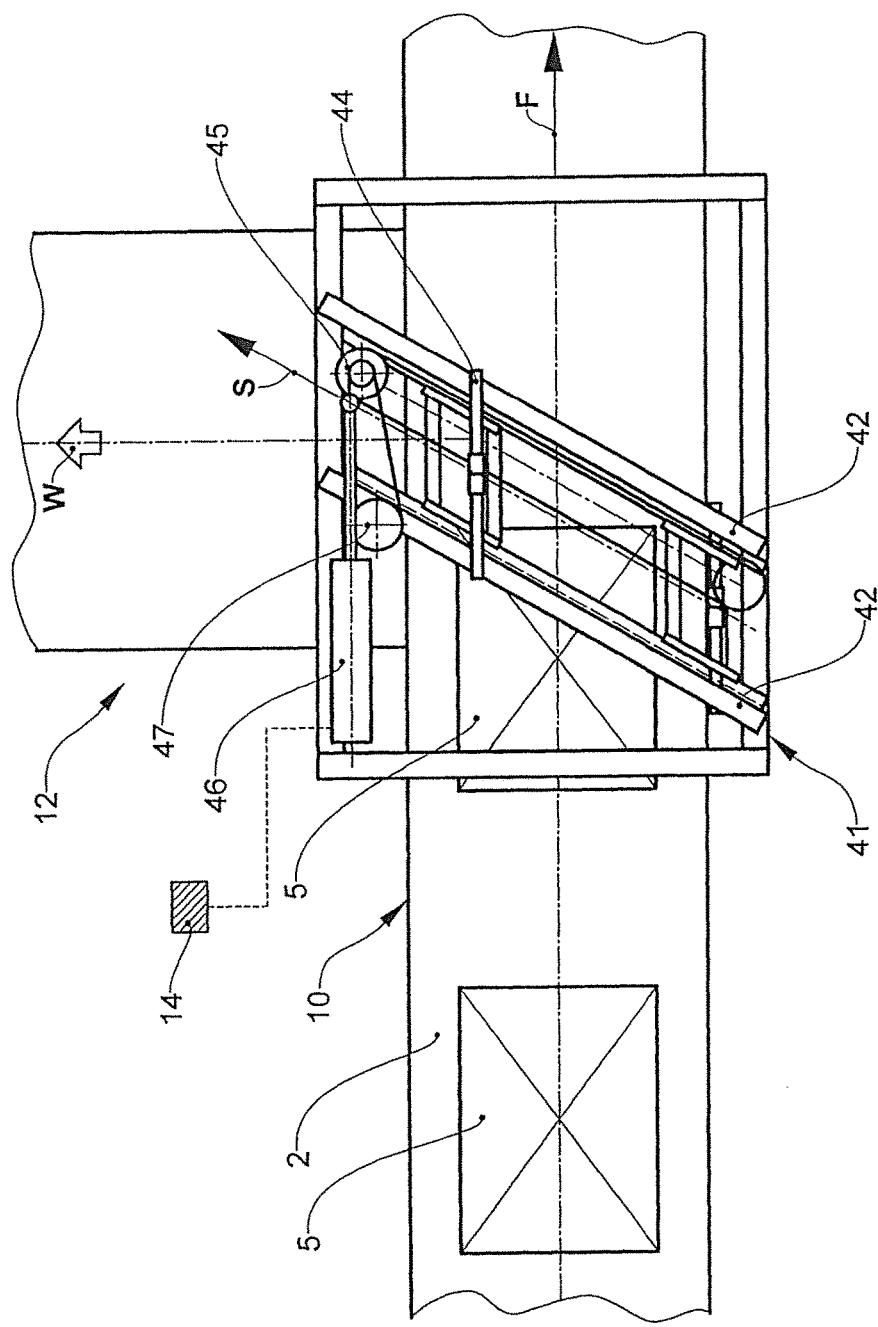
FIG. 6: a plan view of an appliance according to the invention, from the region of the pushing device, according to a second embodiment.
Figure 7:
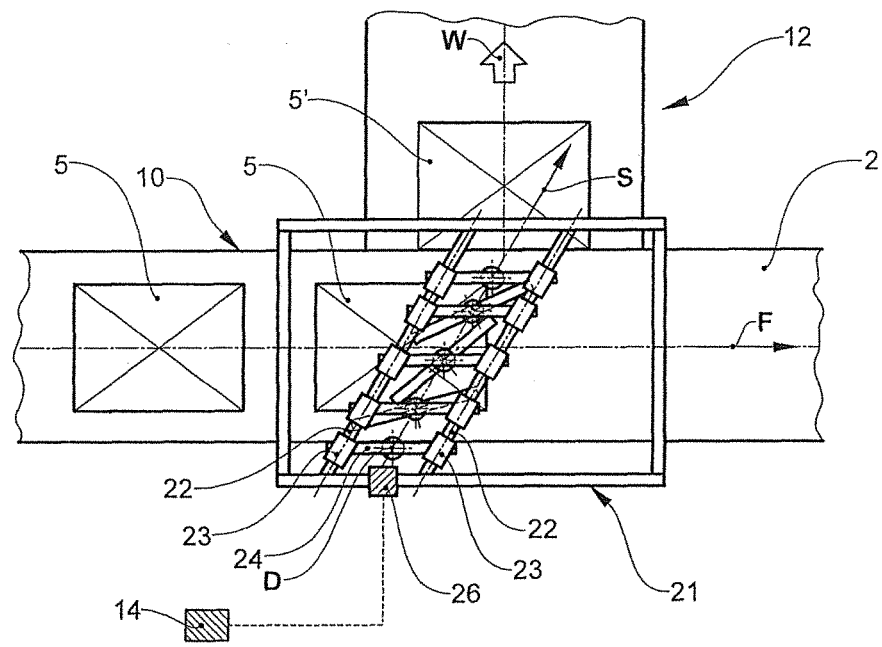
FIG. 7: a plan view of an appliance according to the invention, from the region of the pushing device, according to a third embodiment.

The pushing devices according to FIGS. 5 to 7 each include a mount 21, 31, 41 that is erected transversely over the conveying element 2, from profiles. A guide arrangement 22, 32, 42 with guide profiles is attached on the mount 21, 31, 41, over the conveying element 2. A paddle-like push element 24, 34, 44 is displaceably guided on the guide profiles via a guide member 23, 33, 43, so that this push element executes a guided push travel transversely to the conveying direction F. The push element 24, 34, 44 is driven via a drive arrangement 26, 36, 46. The drive arrangement 26, 36, 46 and thus the drive of the push element 24, 34, 44 is effected via a control device 14.

The pushing device is designed to push the piece goods 5 that are conveyed on the conveying element 5, transversely to the conveying direction F, to a take-over device 12. The segregated piece goods 5' are received by the take-over device 12 and are conveyed away in the conveying-away direction W.

According to the embodiment according to FIGS. 5*a* to 5*c*, the push direction S of the push element 34 runs perpendicularly to the conveying direction F. Accordingly, the guide profiles of the guide arrangement 32 likewise run perpendicularly to the conveying direction F. The push element 34 can be driven, e.g., by a servo-drive.

According to the embodiment according to FIG. 6, the push direction S of the push element runs obliquely to the conveying direction F and has a movement component parallel to the conveying direction F as well as a movement component perpendicular to the conveying direction F. The movement component perpendicular to the conveying direction F forms the push travel $H_S$. Accordingly, the guide profiles of the guide arrangement 42 run obliquely in the push direction S.

The drive arrangement 46 includes a pneumatic drive which drives the push element 44 via a transmission. The transmission comprises a telescopic slide as well as a chain drive 45. The cylinder of the pneumatic drive actuates the telescopic slide which can execute a to and fro movement. The telescopic slide in turn transmits the linear movement onto the chain drive 45. This drive type however is not restricted to a certain push direction S and thus alignment of the guide arrangement 42.

According to the embodiment according to FIG. 7, the push direction S of the push element likewise runs obliquely to the conveying direction F and has a movement component parallel to the conveying direction F as well as a movement component perpendicular to the conveying direction F. Accordingly, the guide profiles of the guide arrangement 22 run obliquely in the push direction S.

The push element 24 is moreover rotatably mounted about a rotation axis D running perpendicularly to the conveying surface. The push element can be rotated into an orientation transverse to the conveying direction F by way of rotating the push element 24 about the rotation axis D. The push element 24 can be rotated out of the region of influence of a subsequent piece good 5 by way of this. This can be particularly necessary when two adjacent piece goods 5 are only distanced little from one another. The rotatability of the push element 24 however is not restricted to a certain push direction S and thus alignment of the guide arrangement.

The pushing devices according to FIGS. 5 to 7 can be arbitrarily combined with position-determining devices according to the FIGS. 1 to 3.

Figure 8:
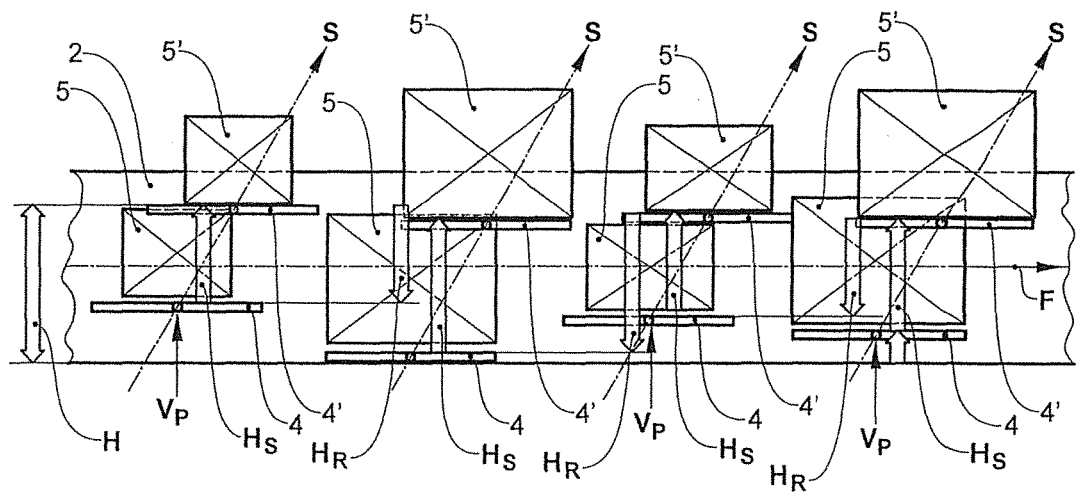
FIG. 8: a plan view onto a schematically represented conveying device, with push elements in different forward positions.

FIG. 8 shows a plurality of differently large piece goods 5 that are positioned on the conveying element 2 at different locations. The different forward positions $V_P$ of the push element 4 are moreover represented for the individual piece goods 5.

With conventional pushing devices, the push element after each push travel is moved back into an initial position at the edge of or behind the conveying element. The initial position is set such that this safely lies outside the conveying region of the piece goods. A maximal travel H is carried out with a push procedure on account of this.

According to the present invention, the push travel $H_S$ is effected from the forward position $V_P$. The push travel $H_S$ as a result of this is only as large as is necessary for segregating the piece good 5.

The magnitude of the return travel $H_R$ of the push element 4' is dependent on the forward position $V_P$ of the piece good 5 that is to be segregated next of all, or as the case may be is dependent on the waiting position, which however is not the case in the shown embodiment example.

The return travel $H_R$ can hence be larger than, equal to or smaller than the push travel $H_S$. The return travel $H_R$ however is always at least so large, that the push element 4 does not come to lie in the movement region of a subsequent piece good 5.

The invention claimed is:

1. A method for detecting and for targeted segregation of individual piece goods that are conveyed in a conveying direction one after the other on an extensive conveying element,
   displacing a piece good to be segregated transversely to the conveying direction by a push element, the push element being moved transversely to the conveying direction into a conveying region of the piece goods,
   determining positional information concerning a region of the piece good to be segregated, which faces the push element, by way of a position-determining device, and a forward position is determined on account of the positional information, and
   determining the forward position by a control device in dependence on the positional information concerning the piece good, which is to be segregated, on the conveying element, and
   wherein before pushing of the piece good, the push element is moved into the forward position lying above the conveying element in the conveying region, and the piece good is pushed over the conveying element by the element by accelerating the push element out of the forward position in a push direction, and
   wherein the position-determining device forms a first and a second measuring beam path, wherein an orthogonal projection of the first measuring beam path and of the second measuring beam path onto a plane, in which a conveying surface of the conveying element lies, is indicated as a first and a second measuring beam path projection,
   wherein the first measuring beam path projection and the second measuring beam path projection intersect outside the conveying surface.

2. The method according to claim 1, wherein the position-determining device determines the positional information of the piece good while using at least one predetermined characteristic of the piece good.

3. The method according to claim 2, wherein the position-determining device determines the positional information of the piece good while using the predetermined information that in a section of the conveying element that extends from upstream of the position-determining device in the conveying direction to downstream of the push element, the region of the piece good to be segregated that faces the push element is arranged essentially parallel to the conveying direction in an orthogonal projection onto the conveying surface.

4. The method according to claim 1, wherein the position-determining device determines a length of an orthogonal projection of the region of the piece good to be segregated that faces the push element, onto the conveying surface.

5. The method according to claim 1, wherein on pushing the piece good, the push element engages the region of the piece good to be segregated that faces the push element, in an essentially central manner in an orthogonal projection onto the conveying surface, for the targeted segregation.

6. The method according to claim 1, wherein the position-determining device forms a first and a second measuring beam path, by way of the position-determining device emitting a first and a second light beam.

7. The method according to claim 1, wherein the push element pushes the piece good beyond the conveying element, with the targeted segregation of the piece good.

8. The method according to claim 1, wherein positional information concerning a region of the piece goods not to be segregated that faces the push element is determined by way of the position-determining device, and a waiting position, into which the push element is moved back after the pushing of a piece good, is determined on account of the positional information.

9. The method according to claim 8, wherein, considered from the forward position in the push direction, the waiting position lies behind the forward position of the piece good, which is to be segregated next.

10. The method according to claim 1, wherein the position-determining device comprises two light barriers, whose light beams each enclose an acute angle to a plane that is arranged perpendicularly to the conveying direction, and positional information concerning a region of the piece good that faces the push element is determined by way of the control device on the basis of the conveying speed of the piece good and of a first signal generated by the interruption of the first light beam and of a second signal generated by the interruption of the second light beam, due to a piece good conveyed past the light barriers.

11. The method according to claim 1, wherein, for pushing the piece good, the push element is moved over the conveying element with a movement component in the conveying direction.

12. The method according to claim 1, wherein movement energy is converted into electrical energy via a recuperation brake on braking the push element.

13. The method according to claim 1, wherein the push element is stopped on reaching the forward position, and the push element waits in the forward position until the arrival of the piece good.

14. An appliance for detecting and targeted segregation of individual piece goods according to the method of claim 1, said appliance comprising:
   a conveying device comprising a movable, extensive conveying element with a conveying surface, on which piece goods can be conveyed one after the other in a conveying direction,
   a pushing device comprising a push element, which is movable over the conveying element into the conveying regions of the piece goods, for pushing a piece good transversely to the conveying direction, a control device for controlling the movement of the push element, with a position-determining device for determining positional information concerning the piece goods on the conveying element, wherein the position-determining device comprises a first and a second measuring beam path, and an orthogonal projection of the first measuring beam path and of the second measuring beam path onto a plane, in which the conveying surface lies, is indicated as a first and a second measuring beam path projection, and wherein the control device is designed to determine a forward position for the push element from the positional information determined by way of the position-determining device and to move the push element into the determined forward position before the pushing of the piece good, wherein an intersection point of the first measuring beam path projection and of the second measuring beam path projection is arranged outside the conveying surface.

15. The appliance according to claim 14, wherein the position-determining device comprises an opto-electronic measuring system with at least one opto-electronic component for determining positional information concerning piece goods.

16. The appliance according to claim 15, wherein the position-determining device comprises at least one light barrier.

17. The appliance according to claim 16, wherein the position-determining device comprises two light barriers whose light beams each enclose an acute angle with a plane perpendicular to the conveying direction.

18. The appliance according to claim 17, wherein the light sources of the light barriers are arranged above one another or next to one another.

19. The appliance according to claim 14, wherein the appliance comprises a sensor device for determining a speed of the conveying element in the region of the pushing device.

20. The appliance according to claim 14, wherein the pushing device comprises a guide arrangement that is arranged above the conveying element and by way of which the push element can be guided over the conveying element.

21. The appliance according to claim 14, wherein the pushing device comprises a servo-drive for driving the push element.

22. The appliance according to claim 14, wherein the push element is rotatably mounted about a rotation axis arranged essentially perpendicularly to the conveying surface of the conveying element.

23. The appliance according to claim 14, wherein the push device comprises a recuperation brake, by way of which movement energy can be converted into electrical energy on braking the push element.

24. A kit for an appliance according to claim 14, for carrying out the method according to claim 1, comprising a pushing device with a mount, which is supported at least at one or two sides, wherein the mount forms a support structure, which is positionable over a conveying element, and a guide arrangement and a push element, which is guidably mounted in the guide arrangement is arranged on the support structure.

* * * * *